United States Patent
Uhlhorn

(10) Patent No.: US 7,991,288 B1
(45) Date of Patent: Aug. 2, 2011

(54) OPTICAL CODE DIVISION MULTIPLE ACCESS DATA STORAGE ENCRYPTION AND RETRIEVAL

(75) Inventor: Brian L. Uhlhorn, St. Paul, MN (US)

(73) Assignee: Lockheed Martin Corporation, Bethesda, MD (US)

( * ) Notice: Subject to any disclaimer, the term of this patent is extended or adjusted under 35 U.S.C. 154(b) by 1116 days.

(21) Appl. No.: 11/349,389

(22) Filed: Feb. 7, 2006

(51) Int. Cl.
*H04J 4/00* (2006.01)
*H04B 10/06* (2006.01)

(52) U.S. Cl. ..................... 398/78; 398/202; 398/212

(58) Field of Classification Search .............. 398/77–78, 398/202–214
See application file for complete search history.

(56) References Cited

U.S. PATENT DOCUMENTS

| | | | | |
|---|---|---|---|---|
| 4,506,387 A | * | 3/1985 | Walter | 398/66 |
| 4,723,310 A | * | 2/1988 | De Corlieu et al. | 398/154 |
| 4,779,266 A | | 10/1988 | Chung et al. | |
| 5,005,166 A | * | 4/1991 | Suzuki et al. | 398/47 |
| 5,327,276 A | * | 7/1994 | Shimosaka et al. | 398/58 |
| 5,404,240 A | * | 4/1995 | Nishio et al. | 398/75 |
| 5,424,543 A | * | 6/1995 | Dombrowski et al. | 250/330 |
| 5,450,224 A | * | 9/1995 | Johansson | 398/50 |
| 5,594,577 A | * | 1/1997 | Majima et al. | 398/79 |
| 5,686,722 A | * | 11/1997 | Dubois et al. | 250/226 |
| 5,793,907 A | * | 8/1998 | Jalali et al. | 385/24 |
| 5,838,437 A | * | 11/1998 | Miller et al. | 356/478 |
| 6,014,237 A | * | 1/2000 | Abeles et al. | 398/87 |
| 6,025,944 A | * | 2/2000 | Mendez et al. | 398/78 |
| 6,038,357 A | * | 3/2000 | Pan | 385/24 |
| 6,233,628 B1 | * | 5/2001 | Salmonsen et al. | 710/27 |
| 6,292,282 B1 | | 9/2001 | Mossberg et al. | |
| 6,388,782 B1 | * | 5/2002 | Stephens et al. | 398/79 |
| 6,486,984 B1 | * | 11/2002 | Baney et al. | 398/212 |
| 6,532,556 B1 | * | 3/2003 | Wong et al. | 714/702 |
| 6,594,050 B2 | * | 7/2003 | Jannson et al. | 398/52 |
| 6,614,950 B2 | * | 9/2003 | Huang et al. | 385/15 |
| 6,628,864 B2 | * | 9/2003 | Richardson et al. | 385/37 |
| 6,690,853 B1 | * | 2/2004 | Alaimo et al. | 385/24 |
| 6,721,306 B1 | * | 4/2004 | Farris et al. | 370/352 |
| 6,728,445 B2 | * | 4/2004 | Blomquist et al. | 385/37 |

(Continued)

OTHER PUBLICATIONS

Kwong, et al. Design of Multilength Optical Orthogonal Codes for Optical CDMA Multimedia Networks. IEEE Transactions on Communications. Aug. 2002. vol. 50. No. 8. pp. 1258-1265.

*Primary Examiner* — Ken N Vanderpuye
*Assistant Examiner* — Danny W. Leung
(74) *Attorney, Agent, or Firm* — Marsh Fischmann & Breyfogle LLP

(57) ABSTRACT

OCDMA systems provide for storage and retrieval of OCDMA data while maintaining OCDMA encoding. One system includes an optical splitter that receives an OCDMA data stream having a multiple wavelengths of light. A plurality of tunable light filters is optically interconnected with the optical splitter. A controller tunes the tunable light filters such that they switch wavelengths of the OCDMA data stream over time. A plurality of light detectors is respectively coupled to the tunable light filters to convert the filtered optical data streams from the tunable light filters to electronic data streams. Each generated electronic data stream is stored with a corresponding storage volume. Retrieval of the OCDMA data is performed by reversing the wavelength switching used to store the OCDMA data stream. The electronic data streams are thereby converted to optical data streams using tunable light generators and subsequently converted into the OCDMA data stream with an optical coupler.

10 Claims, 4 Drawing Sheets

U.S. PATENT DOCUMENTS

| | | | |
|---|---|---|---|
| 6,748,083 B2 * | 6/2004 | Hughes et al. | 380/278 |
| 6,778,102 B1 * | 8/2004 | Grunnet-Jepsen et al. | 341/50 |
| 6,831,773 B2 * | 12/2004 | Pfeiffer et al. | 359/320 |
| 6,839,521 B2 * | 1/2005 | Davis | 398/156 |
| 6,904,239 B2 * | 6/2005 | Chow et al. | 398/49 |
| 6,915,077 B2 * | 7/2005 | Lo | 398/47 |
| 7,035,544 B1 * | 4/2006 | Won | 398/79 |
| 7,063,260 B2 * | 6/2006 | Mossberg et al. | 235/454 |
| 7,110,671 B1 * | 9/2006 | Islam | 398/51 |
| 7,113,703 B2 * | 9/2006 | Murata | 398/79 |
| 7,200,331 B2 * | 4/2007 | Roorda et al. | 398/58 |
| 7,200,342 B2 * | 4/2007 | Dafesh | 398/182 |
| 7,239,772 B2 * | 7/2007 | Wang et al. | 385/17 |
| 7,260,655 B1 * | 8/2007 | Islam | 709/252 |
| 7,308,197 B1 * | 12/2007 | Zhong et al. | 398/48 |
| 7,317,698 B2 * | 1/2008 | Jagger et al. | 370/328 |
| 7,324,753 B2 * | 1/2008 | Kashima et al. | 398/77 |
| 7,330,660 B2 * | 2/2008 | Duelk | 398/91 |
| 7,340,187 B2 * | 3/2008 | Takeshita | 398/209 |
| 7,341,189 B2 * | 3/2008 | Mossberg et al. | 235/454 |
| 7,366,426 B2 * | 4/2008 | Kai et al. | 398/195 |
| 7,369,765 B2 * | 5/2008 | Aoki et al. | 398/45 |
| 7,406,262 B2 * | 7/2008 | Nakagawa et al. | 398/85 |
| 7,415,212 B2 * | 8/2008 | Matsushita et al. | 398/140 |
| 7,418,209 B2 * | 8/2008 | Salamon et al. | 398/185 |
| 7,418,212 B1 * | 8/2008 | Bontu | 398/202 |
| 7,433,600 B2 * | 10/2008 | Katagiri et al. | 398/85 |
| 7,437,080 B2 * | 10/2008 | Schmidt et al. | 398/147 |
| 7,450,239 B2 * | 11/2008 | Uehara et al. | 356/451 |
| 7,474,854 B2 * | 1/2009 | Sekiya et al. | 398/95 |
| 7,499,652 B2 * | 3/2009 | Zhong et al. | 398/83 |
| 7,505,597 B2 * | 3/2009 | Stevens et al. | 380/270 |
| 7,505,687 B2 * | 3/2009 | Jaggi et al. | 398/66 |
| 7,580,636 B2 * | 8/2009 | Nogi | 398/49 |
| 7,792,427 B1 * | 9/2010 | Uhlhorn et al. | 398/77 |
| 2002/0030868 A1 * | 3/2002 | Salomaa | 359/124 |
| 2002/0067523 A1 * | 6/2002 | Way | 359/119 |
| 2002/0067883 A1 * | 6/2002 | Lo | 385/24 |
| 2002/0196541 A1 * | 12/2002 | Cai | 359/497 |
| 2003/0123789 A1 * | 7/2003 | Miyata et al. | 385/24 |
| 2003/0152393 A1 * | 8/2003 | Khoury | 398/207 |
| 2003/0223687 A1 * | 12/2003 | Blomquist et al. | 385/37 |
| 2004/0141499 A1 * | 7/2004 | Kashima et al. | 370/380 |
| 2004/0184809 A1 * | 9/2004 | Miyata et al. | 398/85 |
| 2004/0197099 A1 * | 10/2004 | Kai et al. | 398/85 |
| 2004/0264965 A1 * | 12/2004 | Kobayashi et al. | 398/78 |
| 2005/0019034 A1 * | 1/2005 | Aoki et al. | 398/59 |
| 2005/0111376 A1 * | 5/2005 | Raghothaman et al. | 370/252 |
| 2005/0147414 A1 * | 7/2005 | Morrow et al. | 398/142 |
| 2005/0185959 A1 * | 8/2005 | Kinoshita et al. | 398/59 |
| 2005/0219543 A1 * | 10/2005 | Uehara et al. | 356/450 |
| 2005/0270999 A1 * | 12/2005 | Schiff et al. | 370/318 |
| 2005/0281558 A1 * | 12/2005 | Wang et al. | 398/85 |
| 2006/0098983 A1 * | 5/2006 | Han et al. | 398/83 |
| 2006/0115210 A1 * | 6/2006 | Nakagawa | 385/24 |
| 2006/0171719 A1 * | 8/2006 | Schmidt et al. | 398/158 |
| 2006/0209739 A1 | 9/2006 | Kumar et al. | |
| 2006/0210083 A1 * | 9/2006 | Takemoto et al. | 380/278 |
| 2006/0257143 A1 * | 11/2006 | Cavazzoni et al. | 398/49 |
| 2007/0036553 A1 | 2/2007 | Etamad et al. | |
| 2007/0110442 A1 | 5/2007 | Peer | |
| 2008/0002974 A1 * | 1/2008 | Zhong et al. | 398/48 |
| 2009/0016726 A1 * | 1/2009 | Suzuki et al. | 398/79 |

* cited by examiner

Timing Diagram 800

| Time | Volume $104_1$ | Volume $104_2$ | Volume $104_3$ | Volume $104_4$ | Volume $104_5$ | Volume $104_6$ |
|---|---|---|---|---|---|---|
| 0 | $\lambda_1 00$ | $\lambda_2 00$ | $\lambda_3 00$ | $\lambda_4 00$ | $\lambda_1 00$ | ??? |
| 1 | $\lambda_1 01$ | $\lambda_2 01$ | $\lambda_3 01$ | $\lambda_4 01$ | $\lambda_1 01$ | ??? |
| 2 | $\lambda_1 02$ | $\lambda_2 02$ | $\lambda_3 02$ | $\lambda_4 02$ | $\lambda_1 02$ | $\lambda_3 02$ |
| 3 | $\lambda_1 03$ | $\lambda_2 03$ | $\lambda_3 03$ | $\lambda_4 03$ | $\lambda_1 03$ | $\lambda_3 03$ |
| 4 | $\lambda_1 04$ | $\lambda_2 04$ | $\lambda_3 04$ | $\lambda_4 04$ | $\lambda_1 04$ | $\lambda_3 04$ |
| 5 | $\lambda_1 05$ | $\lambda_2 05$ | $\lambda_3 05$ | $\lambda_4 05$ | $\lambda_1 05$ | $\lambda_3 05$ |
| 6 | $\lambda_4 06$ | $\lambda_2 06$ | $\lambda_2 06$ | $\lambda_4 06$ | $\lambda_1 06$ | $\lambda_3 06$ |
| 7 | $\lambda_4 07$ | $\lambda_2 07$ | $\lambda_2 07$ | $\lambda_4 07$ | $\lambda_1 07$ | $\lambda_3 07$ |
| 8 | $\lambda_4 08$ | $\lambda_2 08$ | $\lambda_2 08$ | $\lambda_4 08$ | $\lambda_1 08$ | $\lambda_3 08$ |
| 9 | $\lambda_4 09$ | $\lambda_2 09$ | $\lambda_2 09$ | $\lambda_4 09$ | $\lambda_1 09$ | $\lambda_3 09$ |
| 10 | $\lambda_4 10$ | ??? | $\lambda_2 10$ | $\lambda_1 10$ | $\lambda_1 10$ | $\lambda_3 10$ |
| 11 | $\lambda_4 11$ | ??? | $\lambda_2 11$ | $\lambda_1 11$ | $\lambda_1 11$ | $\lambda_3 11$ |
| 12 | $\lambda_4 12$ | ??? | $\lambda_2 12$ | $\lambda_1 12$ | $\lambda_1 12$ | $\lambda_3 12$ |
| 13 | $\lambda_4 13$ | $\lambda_3 13$ | $\lambda_2 13$ | $\lambda_1 13$ | $\lambda_1 13$ | $\lambda_3 13$ |
| 14 | $\lambda_4 14$ | $\lambda_3 14$ | $\lambda_2 14$ | $\lambda_1 14$ | ??? | $\lambda_3 14$ |
| 15 | $\lambda_4 15$ | $\lambda_3 15$ | $\lambda_2 15$ | $\lambda_1 15$ | $\lambda_2 15$ | $\lambda_3 15$ |
| 16 | $\lambda_4 16$ | $\lambda_3 16$ | $\lambda_2 16$ | $\lambda_1 16$ | $\lambda_2 16$ | $\lambda_3 16$ |
| 17 | $\lambda_4 17$ | $\lambda_3 17$ | $\lambda_2 17$ | $\lambda_1 17$ | $\lambda_2 17$ | $\lambda_4 17$ |
| 18 | $\lambda_4 18$ | $\lambda_3 18$ | $\lambda_2 18$ | $\lambda_1 18$ | $\lambda_2 18$ | $\lambda_4 18$ |
| 19 | $\lambda_4 19$ | $\lambda_3 19$ | $\lambda_3 19$ | $\lambda_1 19$ | $\lambda_2 19$ | $\lambda_4 19$ |
| 20 | $\lambda_4 20$ | $\lambda_3 20$ | $\lambda_3 20$ | $\lambda_1 20$ | $\lambda_2 20$ | $\lambda_4 20$ |
| 21 | ??? | $\lambda_3 21$ | $\lambda_3 21$ | $\lambda_1 21$ | $\lambda_2 21$ | $\lambda_4 21$ |
| 22 | $\lambda_2 22$ | $\lambda_3 22$ | $\lambda_3 22$ | $\lambda_1 22$ | $\lambda_2 22$ | $\lambda_4 22$ |
| 23 | $\lambda_2 23$ | $\lambda_1 23$ | $\lambda_3 23$ | $\lambda_1 23$ | $\lambda_2 23$ | $\lambda_4 23$ |
| 24 | $\lambda_2 24$ | $\lambda_1 24$ | $\lambda_3 24$ | $\lambda_1 24$ | $\lambda_2 24$ | $\lambda_4 24$ |
| 25 | $\lambda_2 25$ | $\lambda_1 25$ | $\lambda_3 25$ | $\lambda_1 25$ | $\lambda_2 25$ | $\lambda_4 25$ |
| 26 | $\lambda_2 26$ | $\lambda_1 26$ | $\lambda_3 26$ | $\lambda_1 26$ | ??? | $\lambda_4 26$ |
| 27 | $\lambda_2 27$ | $\lambda_1 27$ | $\lambda_3 27$ | $\lambda_3 27$ | ??? | $\lambda_4 27$ |
| 28 | $\lambda_2 28$ | $\lambda_1 28$ | $\lambda_3 28$ | $\lambda_3 28$ | $\lambda_4 28$ | $\lambda_4 28$ |
| 29 | $\lambda_2 29$ | $\Lambda_1 29$ | $\lambda_3 29$ | $\lambda_3 29$ | $\lambda_4 29$ | $\lambda_4 29$ |
| ... | ... | ... | ... | ... | ... | ... |
| ... | ... | ... | ... | ... | ... | ... |

Figure 7

OPTICAL CODE DIVISION MULTIPLE ACCESS DATA STORAGE ENCRYPTION AND RETRIEVAL

CROSS REFERENCE TO RELATED APPLICATIONS

This patent application is related to U.S. Non Provisional patent application Ser. No. 11/317,135 that is entitled "Dynamic Temporal Duration Optical Transmission Privacy", that was filed Dec. 23, 2005 and U.S. patent application Ser. No. 11/343,094, which became U.S. Pat. No. 7,792,427, that is entitled "Optical Code Division Multiple Access Data Storage And Retrieval" and that was filed on Jan. 30, 2006, and the entire contents of which are incorporated by reference herein.

FIELD OF THE INVENTION

The present invention generally relates to the field of storing and retrieving data through an optical network and, more particularly, to storing data from optical data channels of an Optical Code Division Multiple Access (OCDMA) signal to data storage volumes such that the OCDMA signaling and formatting information are retained during storage and regenerated during retrieval. Additionally, the present invention provides for the encryption of the OCDMA signaling wavelengths during storage such that data privacy is enhanced.

BACKGROUND OF THE INVENTION

Optical networks use optical signaling and formatting techniques, such as OCDMA, to support multiple data channels over a single fiber optic cable. The optical communications thereof are typically implemented by transmitting data through fiber-optic links because light is less prone to optical dispersion through fiber-optic links as opposed to other mediums, such as air. These optical communications use light to convey data to an intended receiver through the fiber-optic link, through "on-off keying" of the wavelength. For example, a binary signal (i.e., a signal of logical 1's and logical 0's) is transmitted through a fiber-optic link with the light switching on and off.

Demand on communications has dictated that optical fiber be shared among users. In this regard, a single optical fiber is often shared by multiple binary signals. One method of sharing involves assigning specific time periods to individual users and is called Time Division Multiplexing ("TDM"). During a period of time in TDM, a single user transmits data and other users wait for their time period. Another method of sharing involves assigning specific wavelengths of light to individual users and is called Wavelength Division Multiplexing ("WDM"). In WDM, each user has a specific wavelength of light and may transmit data on that wavelength at any time, but no other user may use that wavelength. Optical Code Division Multiple Access ("OCDMA") is yet another method to share the optical fiber among a number of users. In OCDMA, each user is assigned a unique code that is composed of temporal and wavelength components. This unique OCDMA signature may be thought of as a unique identifier or thumbprint on a data stream. For a user to receive a data stream, the user must detect a data stream having an appropriate OCDMA signature.

To store such optical network communications, the data therein is typically decoded and converted to electronic data and stored in a storage element using a conventional disk block format. The optical to electronic conversion results in the removal of the original optical signaling and formatting information used to transfer the data over the network.

SUMMARY OF THE INVENTION

The systems and methods presented herein allow for OCDMA formatting information to be stored in a storage unit along with the user data. In this regard, the OCDMA formatting may be regenerated upon data retrieval. In one embodiment of the invention, the OCDMA signaling employs a two-dimensional coding technique allowing privatized individual channels of optical data and protection of the data while resident on the data storage system. Additionally, these systems and methods encrypt the OCDMA signaling by switching wavelengths to storage volumes during storage such that data privacy is enhanced.

In a first aspect, an OCDMA storage system includes an optical splitter optically interconnected with an optical network and a plurality of tunable filters optically interconnected with the optical splitter. The OCDMA storage system also includes a plurality of light detectors respectively optically coupled to the plurality of tunable filters and a plurality of storage volumes communicatively coupled to the plurality of light detectors, wherein each storage volume stores a generated electronic data stream associated with a plurality of tuned wavelengths of light.

The optical splitter may receive an OCDMA data stream from the optical network and divide the OCDMA data stream into a plurality of divided power OCDMA data streams. Each tunable filter may receive one divided power OCDMA data stream from the optical splitter and select one wavelength of light of the one divided power OCDMA data stream to filter at a time. Additionally, the OCDMA storage system may include a controller communicatively coupled to the plurality of tunable filters. The controller tunes the plurality of tunable filters such that each tunable filter selectively filters one wavelength of light.

In a second aspect, a method of encrypting an OCDMA data stream for storage includes steps of receiving the OCDMA data stream, dividing the OCDMA data stream to provide a plurality of optical signals, and transferring the plurality of optical signals to a plurality of tunable filters. The method also includes steps of tuning the plurality of tunable filters to filter wavelengths of light of the plurality of optical signals, converting each wavelength of light to an electronic data stream, and repeating the steps of tuning and converting.

The method may further include a step of storing each electronic data stream with a storage volume unit. In this regard, the storage volume unit includes a plurality of storage volumes, wherein each storage volume is communicatively coupled to one light detector used to execute the step of converting.

The step of tuning may include steps of receiving, with one of the plurality of tunable filters, one of the plurality of optical signals, and selectively filtering a wavelength of light from the one of the plurality of optical signals. Alternatively or additionally, the step of tuning may include a step of controlling the tunable filters to each filter a particular wavelength of light of a corresponding one of the plurality of optical signals. The step of repeating the step of tuning may include a step of randomly changing which wavelengths of light are filtered by the plurality of tunable filters.

In a third aspect, an OCDMA data retrieval system includes a storage volume unit includes a plurality of storage volumes, wherein each storage volume includes an electronic data stream. The OCDMA data retrieval system also includes a plurality of tunable light generators, wherein each of the plurality of tunable light generators is communicatively coupled to a corresponding storage volume of said plurality of storage volumes. The OCDMA data retrieval system further includes a controller communicatively coupled to each of the plurality of tunable light generators. The controller tunes each of the plurality of tunable light generators such that each light generator converts a corresponding electronic data stream to a plurality of optical data streams over time. Each optical data stream has a unique wavelength of light. Additionally, the OCDMA data retrieval system includes an optical coupler optically interconnected with the plurality of tunable light generators, wherein the optical coupler combines the optical data streams to provide an OCDMA data stream.

The optical coupler may further optically interconnect with an optical network for transferring the OCDMA data stream to the optical network. In this regard, the OCDMA data retrieval system may also include a fiber-optic link between the optical coupler and the optical network. The controller randomly tunes each of the plurality of tunable light generators such that all wavelengths of light of the OCDMA data stream are generated.

In a fourth aspect, a method of retrieving an OCDMA data stream from storage includes steps of retrieving information used to wavelength encrypt an OCDMA data stream during storage and transferring a plurality of electronic data streams from a plurality of storage volumes to a plurality of tunable light generators. Each storage volume is associated with one of the plurality of tunable light generators. The method also includes steps of tuning each of the tunable light generators using the information to generate a plurality of optical data streams and multiplexing the plurality of optical data streams to generate an OCDMA data stream.

The method may further include a step of decoding said OCDMA data stream to extract a data channel from said OCDMA data stream. The method may also include a step of splitting the OCDMA data stream into a plurality of divided power OCDMA data streams. The method may also include a step of repeating the step of tuning such that each tunable light generator switches to generate an optical data stream from a different wavelength of light. The step of tuning includes controlling the plurality of tunable light generators with a controller.

In a fifth aspect, a method of storing data includes steps of splitting a first optical signal into a plurality of divided power optical signals, wherein the step of splitting provides each divided power optical signal having less optical power than the first optical signal and filtering a plurality of optical data streams from the plurality of divided power optical signals. The method also includes a step of changeably associating each of the plurality of optical data streams with one or more of a plurality of storage volumes.

The method may further include a step of storing the plurality of optical data streams with the plurality of storage volumes. In this regard, each storage volume is communicatively coupled to one or more light detectors and each light detector is used to detect one of the plurality of optical data streams and generate a corresponding electronic data stream. The step of changeably associating each of the plurality of optical data streams may include a step of changing filter characteristics with the step of filtering to generate a respective optical data stream. Alternatively or additionally, the step of changeably associating each of the plurality of optical data streams may include a step of switching filtered optical data streams to the plurality of storage volumes.

BRIEF DESCRIPTION OF THE INVENTION AND THE SEVERAL VIEWS OF THE DRAWINGS

FIG. 7 is an exemplary data transmission diagram illustrating switched storage for wavelengths of optical data.

DETAILED DESCRIPTION OF THE INVENTION

Figure 1:
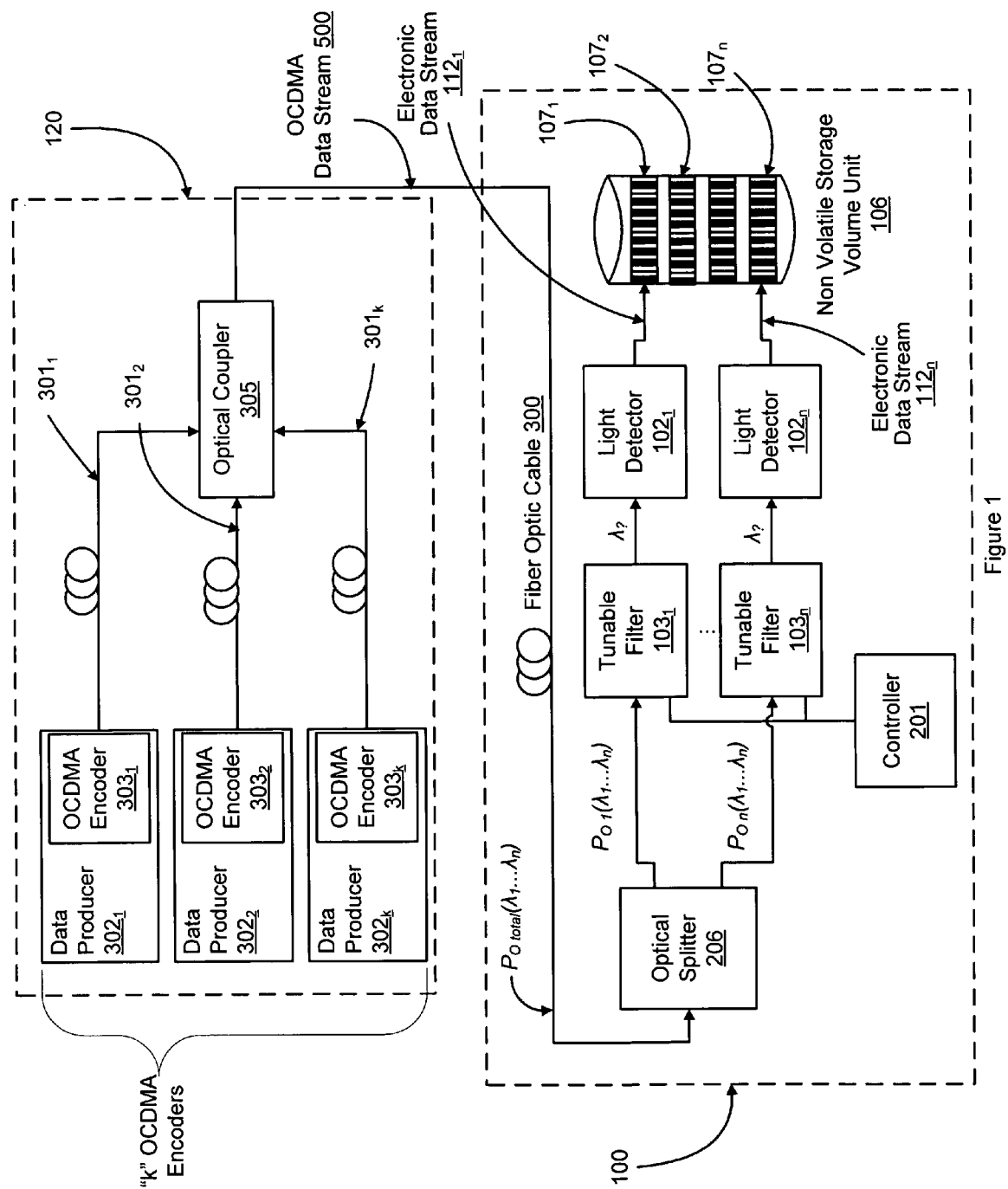
FIG. 1 is a block diagram of an exemplary system for storing OCDMA data.

FIG. 1 is a block diagram of system 100 that stores OCDMA data. In this embodiment, system 100 includes optical splitter 206, controller 201, a plurality of tunable filters 103$_{1...n}$ (wherein n is an integer greater than 1), a plurality of light detectors 102$_{1...n}$, and nonvolatile storage volume unit 106. System 100 is optically coupled to optical network 120 via fiber-optic cable 300. More specifically, system 100 is optically coupled to optical coupler 305 via fiber-optic cable 300 to store data from a plurality of data producers 302$_{1...k}$ (wherein k is an integer greater than 1). Examples of nonvolatile storage volume unit 106 include rotating disk drives and flash memory cards, each having a plurality of logical partitions (i.e., storage volumes 107$_{1...n}$). Generally, the "disk block structure" employed by nonvolatile storage volume unit 106 is application dependent (e.g., Redundant Array of Independent Disk—"RAID"—storage systems, Non Volatile Random Access Memory—"NVRAM").

Each data producer 302 is generally an electronic device capable of electronically generating data. For example, each data producer 302 may be an embedded computer system executing a software algorithm. In this regard, each data producer 302 may require that its output be stored to nonvolatile storage volume unit 106. As shown herein, each data producer 302 includes a corresponding OCDMA encoder 303 (e.g., data producer 302$_1$ includes OCDMA encoder 303$_1$, data producer 302$_2$ includes OCDMA encoder 303$_2$, etc.). However, data producers 302$_{1...k}$ may each host multiple OCDMA encoder 303 units.

Figure 6:
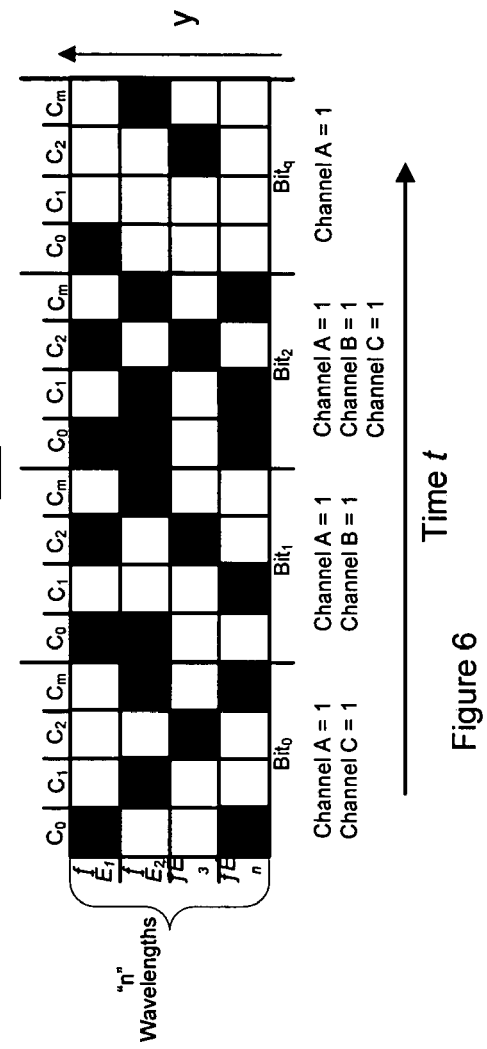
FIG. 6 is a diagram of an optical data stream using the OCDMA signature codes of FIGS. 3-5.

Each OCDMA encoder 303 converts the electronically generated data from its corresponding data producer 302 into an optical format (i.e., an OCDMA signal, such as OCDMA data stream 500 of FIG. 6). In this regard, OCDMA encoder 303 is generally programmed with a unique OCDMA signature code that determines the spread sequence for a given data channel (e.g., channel "A" OCDMA signature code 505 of FIG. 3). This inherent signature code aspect of OCDMA allows for data privacy while the data resides on nonvolatile storage volume unit 106. Timing information of the OCDMA signature codes may also be stored with nonvolatile storage volume unit 106, for reasons explained below. The maximum number k of OCDMA encoders 303 allowed for a given implementation of system 100 depends on the maximum number n of OCDMA signature codes supported by the OCDMA coding technique. Those skilled in the art are readily familiar with various OCDMA coding techniques.

Optical coupler 305 is the common collection point for OCDMA encoders $303_{1...k}$. Point-to-point fiber optic cable 301 optically connects a corresponding OCDMA encoder 303 to optical coupler 305 (e.g., point-to-point fiber optic cable $301_1$ optically connects OCDMA encoder $303_1$ to optical coupler 305, point-to-point fiber optic cable $301_2$ optically connects OCDMA encoder $303_2$ to optical coupler 305, etc.). Optical coupler 305 combines optical signals from the OCDMA encoders $303_{1...k}$ and generates a single OCDMA data stream 500.

Optical splitter 206 is configured for receiving OCDMA data stream 500 from a fiber optic network. For example, optical splitter 206 may couple to optical coupler 305 via fiber-optic cable 300 to receive OCDMA data stream 500. Upon receiving OCDMA data stream 500, optical splitter 206 may split the optical signal $P_{0total}(\lambda_1 \ldots \lambda_n)$ comprising OCDMA data stream 500 into a plurality of optical signals $P_{01}(\lambda_1 \ldots \lambda_n) \ldots P_{01}(\lambda_1 \ldots \lambda_n)$, with each typically having the same intensity. In this regard, each optical signal $P_0(\lambda_1 \ldots \lambda_n)$ maintains all wavelengths of light $\lambda_1 \ldots \lambda_n$ of the optical signal $P_{0total}(\lambda_1 \ldots \lambda_n)$. Optical splitters, such as optical splitter 206, are readily understood devices by those skilled in the art.

Once split, each optical signal $P_0(\lambda_1 \ldots \lambda_n)$ is transferred to a corresponding tunable filter 103. For example, optical splitter 206 may optically couple to each tunable filter 103 to transfer an individual optical signal $P_0(\lambda_1 \ldots \lambda_n)$ to each tunable filter 103. In this regard, each tunable filter 103 may receive an individual optical signal $P_0(\lambda_1 \ldots \lambda_n)$ and, in turn, selectively filter one wavelength of light $\lambda$ for a corresponding light detector 102. That is, each tunable filter 103 may provide a single wavelength of light $\lambda$ of the plurality of wavelengths of light $\lambda_1 \ldots \lambda_n$ that form optical signal $P_{0total}(\lambda_1 \ldots \lambda_n)$ to a light detector 102 at a given time. The wavelength of light $\lambda$ that is provided to a light detector 102 is determined by controller 201.

Each light detector 102 may subsequently convert a received wavelength of light to a corresponding electronic data stream 112. Generally, the maximum number n of wavelengths of light $\lambda$ for a given implementation of system 100 depends on the OCDMA coding scheme employed. That is, the OCDMA coding scheme may have an established number of wavelengths of light that determines the number of light detectors 102 to be used with system 100. The number n of wavelengths of light $\lambda$ are exemplarily shown on the y-axis of OCDMA data stream 500 in FIG. 6.

Upon conversion of the optical data stream 500 to electronic data streams $112_{1...n}$, each electronic data stream 112 is transferred to a corresponding storage volume 107 within nonvolatile storage volume unit 106 (e.g., electronic data stream $112_1$ is stored with storage volume $107_1$, electronic data stream $112_2$ is stored with storage volume $107_2$, etc.). Timing information, as mentioned above, of a particular electronic data stream 112 is also stored with the corresponding storage volume 107. For example, data for a particular channel within OCDMA data stream 500 may be dispersed across a plurality of wavelengths because of the tuning of tunable filters $103_{1...n}$. As such, each electronic data stream 112, being stored according to wavelength, may use timing information of the other electronic data streams such that data may be retrieved from nonvolatile storage volume unit 106 at a later date. That is, the timing information is used to extract the electronic data streams 112 from the storage volumes 107 in a manner that replicates the original OCDMA signal such that the individual data channels may thereafter be extracted therefrom.

In addition to the data privacy that is achieved through the storage of an OCDMA signal according to wavelength of light $\lambda$ (e.g., as described in U.S. patent application Ser. No. 11/343,094, which became U.S. Pat. No. 7,792,427, hereinafter the "'427 patent"), data privacy, is enhanced because tunable filters $103_{1...n}$ variably tune to wavelengths of light $\lambda_{1...n}$. For example, tunable filter $103_1$ may tune to wavelength $\lambda_4$ while tunable filter $103_2$ tunes to wavelength $\lambda_4$ and tunable filter $103_3$ tunes to wavelength $\lambda_2$, etc. Tuning of tunable filters $103_{1...n}$ may be a continual process throughout the entire transmission of OCDMA data stream 500. That is, tunable filters $103_{1...n}$ may continually tune through the range of wavelengths $\lambda_{1...n}$ that form optical data stream 500 with each tunable filter 103 generally providing coverage of a single wavelength $\lambda$ at any given time such that all wavelengths $\lambda_{1...n}$ of optical data stream 500 are transferred to light detectors $102_{1...n}$. Tuning operations of tunable filters $103_{1...n}$ are exemplarily illustrated below in FIG. 7.

As stated, the wavelength of light $\lambda$ that is provided to a light detector 102 is determined by controller 201. For example, controller 201 may be communicatively coupled to tunable filters $103_{1...n}$ such that controller 201 may control tunable filters $103_{1...n}$. In this regard, controller 201 may generate control signal that determines a wavelength of light $\lambda$ that a particular tunable filter 103 may pass to an associated light detector 102. Wavelength selection for tunable filters $103_{1...n}$ may be substantially random or performed according to a pattern such that data privacy is enhanced. For example, controller 201 may direct tunable filters $103_{1...n}$ to randomly switch between wavelengths during transmission of OCDMA data stream 500 while ensuring that each wavelength of light $\lambda$ for OCDMA data stream 500 is received by a light detector 102.

Generally, the retrieval of data requires knowledge of the manner in which wavelengths of light $\lambda$ for OCDMA data stream 500 are stored with nonvolatile storage volume unit 106. For example, controller 201 may use the pattern and associated timing used to control tunable filters 103 to retrieve the data from nonvolatile storage volume unit 106. Such is described below in FIG. 2. Additionally, since the data is stored according to wavelength of light $\lambda$, albeit controllably selected, retrieval of the data may require the same OCDMA signature codes used during the encoding process, such as that described in the '427 patent.

Figure 2:
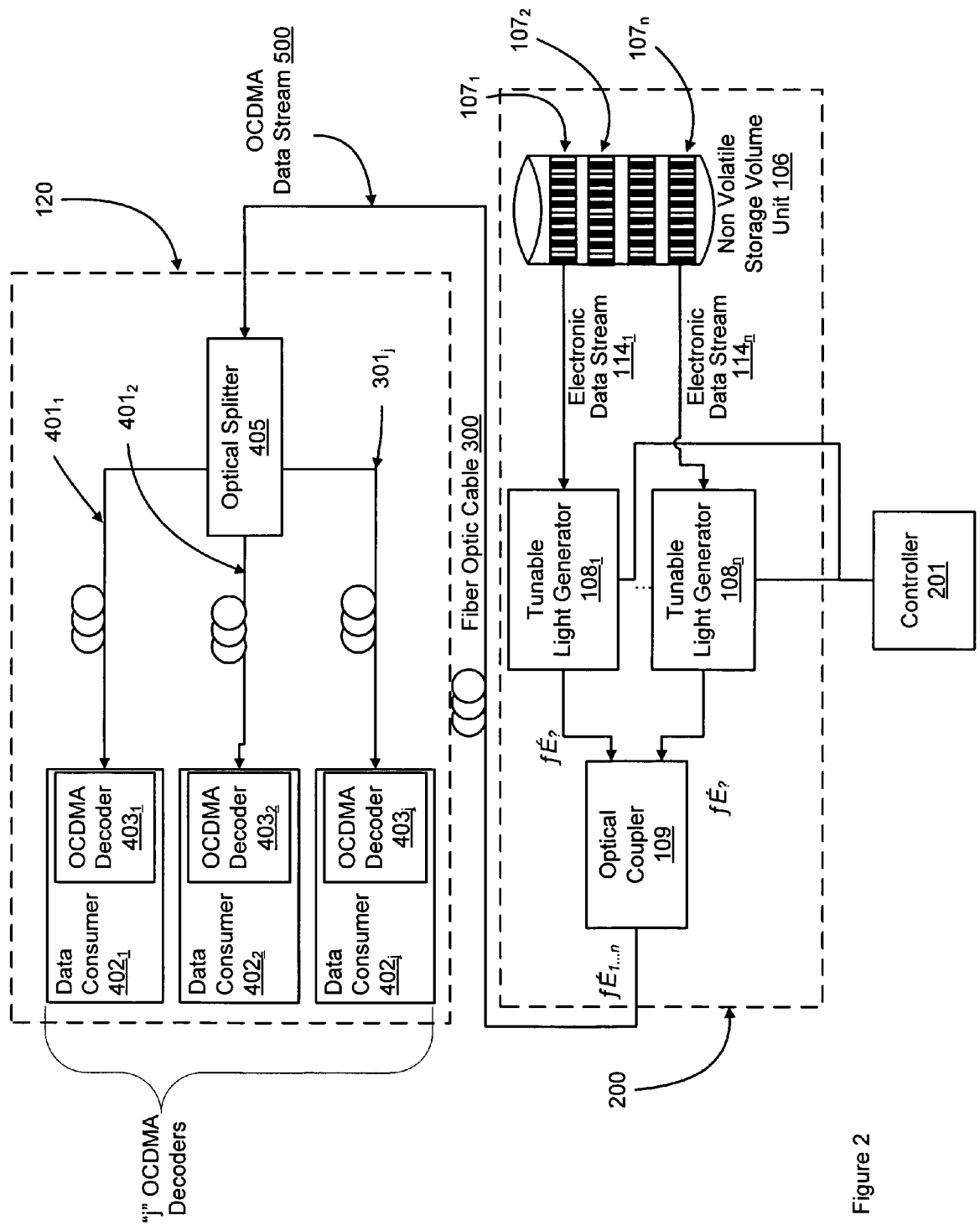
FIG. 2 is a block diagram of an exemplary system for retrieving OCDMA data.

FIG. 2 is a block diagram of exemplary system 200 for retrieving OCDMA data. System 200 includes optical coupler 109, tunable light generators $108_{1...n}$, nonvolatile storage volume unit 106 discussed above, which further includes storage volumes $107_{1...n}$. System 200 also includes controller 201 as described hereinabove to control the tuning of tunable light generators $108_{1...n}$ in the same manner in which controller 201 controlled tunable filters $103_{1...n}$ to store electronic data streams $112_{1...n}$. Optical coupler 109 is configured for multiplexing the individual wavelengths of light generated by tunable light generators $108_{1...n}$. In this regard, optical coupler 109 may reconstruct OCDMA data stream 500 for access by data consumers $402_{1...j}$ (where j is an integer greater than 1). Generally, data consumers $402_{1...j}$ may be any electronic devices capable of retrieving stored data. For example, a data consumer 402 may be an embedded computer system executing a software algorithm. In this regard, each data consumer 402 may require that its input be retrieved from nonvolatile storage volume unit 106.

Each of electronic data streams $114_{1...n}$ are retrieved from nonvolatile storage volume unit 106 via corresponding tunable light generators $108_{1...n}$. For example, electronic data streams $114_{1...n}$ are each associated with wavelengths of light $\lambda_{1...n}$. In this regard, the OCDMA signature codes of OCDMA data stream 500 may not be required to decode the data. Rather, tunable light generators $108_{1...n}$ may retrieve electronic data streams $114_{1...n}$ from associated storage volumes $107_{1...n}$. Tunable light generators $108_{1...n}$ may then convert the electronic data streams $114_{1...n}$ to wavelengths of light λ (i.e., that form optical data streams f of optical data stream 500), when directed by data consumers $402_{1...n}$ and based on the manner in which wavelengths of light λ were stored with nonvolatile storage volume unit 106. That is, each storage volume 107 may have data stored that is associated with a plurality of wavelengths of light λ. Tunable light generators $108_{1...n}$ may tune to the wavelengths of light λ according to wavelengths of wavelengths of light λ which were used to store the data with nonvolatile storage volume unit 106. In this regard, tunable light generators $108_{1...n}$ may "undo" the wavelength tuning that was used to store the data as described in FIG. 1.

As similarly described hereinabove, the maximum number n of wavelengths of light λ for a given implementation of system 200 generally depends on the OCDMA coding scheme employed. Again, the number n of wavelengths of light are shown on the y-axis of OCDMA data stream 500 in FIG. 6. Additionally, each electronic data stream 114 may have timing information configured therewith such that electronic data streams $114_{1...n}$ may be retrieved from storage volumes 1071 . . . n such that OCDMA data stream 500 may be reconstructed to its form prior to storage.

Upon conversion of electronic data streams $114_{1...n}$ to optical data streams f E, optical coupler 109 combines the individual wavelengths of light λ of data streams f E generated by tunable light generators $108_{1...n}$. In this regard, optical coupler 109 reconstructs the OCDMA data stream 500 for access by data consumers $402_{1...n}$. Since the OCDMA coding scheme is generally retained with nonvolatile storage volume unit 106, optical coupler 109 may combine the generated individual wavelengths of light $\lambda_{1...n}$ of OCDMA data stream 500 and thereby reconstruct the OCDMA data stream 500 for access by data consumers $402_{1...n}$. As such, optical coupler 109 may couple to optical network 120 via fiber-optic cable 300 for access by data consumers $402_{1...n}$. More specifically, optical coupler 109 may couple to optical splitter 405 via fiber-optic cable 300 for access by data consumers $402_{1...n}$.

Similar to data producers $302_{1...k}$ and their corresponding OCDMA encoders $303_{1...k}$ of FIG. 1, each data consumer 402 includes a corresponding OCDMA decoder 403 (e.g., data consumer $402_1$ includes OCDMA decoder $403_1$, data consumer $402_2$ includes OCDMA decoder $403_2$, etc.). OCDMA decoders 403 are used to extract data from OCDMA data stream 500. As stated above, knowledge of the OCDMA signature code is generally required by OCDMA decoders 403 to decode data within OCDMA data stream 500.

Each OCDMA decoder 403 converts the optical data signal produced by optical splitter 405 into electrically formatted data available to the data consumer 402. For example, optical splitter 405 "splits" OCDMA data stream 500 into individual optical streams with one optical stream per OCDMA decoder 403 (i.e., each OCDMA decoder 403 receives all data of OCDMA data stream 500, generally in equal portions of the overall optical intensity of OCDMA data stream 500). Point-to-point fiber optic cables 401 optically connect optical splitter 405 to each OCDMA decoder 403 (e.g., point-to-point fiber optic cable $401_1$ optically connects optical splitter 405 to OCDMA decoder $403_1$, point-to-point fiber optic cable $401_2$ optically connects optical splitter 405 to OCDMA decoder $403_2$, etc.). With the OCDMA decoders 403 optically interconnected with optical splitter 405, each data consumer 402 may thereby extract data from OCDMA data stream 500 via OCDMA decoder 403. Similar to system 100 of FIG. 1, the maximum number j of OCDMA decoders 403 for a given implementation of system 200 depends on the OCDMA signature codes used. Although each data consumer 402 is shown as being configured with a single corresponding OCDMA decoder 403, data consumers $402_{1...j}$ may each host multiple OCDMA decoder 403 units. Additionally, multiple OCDMA decoders 403 may be programmed with the same OCDMA signature code.

Figure 5:
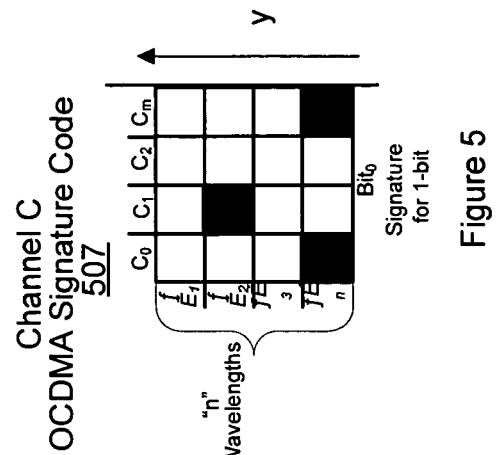
FIG. 5 is a diagram of another exemplary OCDMA signature code.
Figure 4:
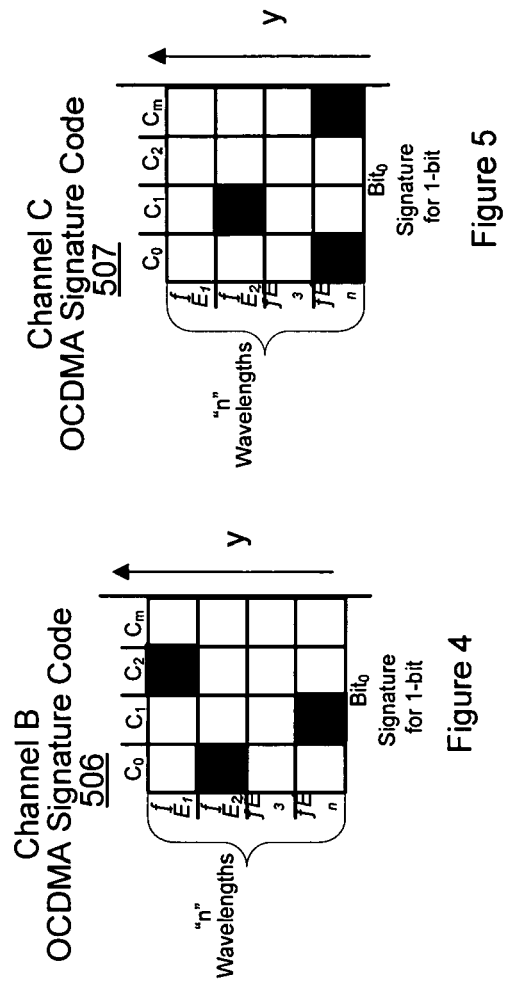
FIG. 4 is a diagram of another exemplary OCDMA signature code.
Figure 3:
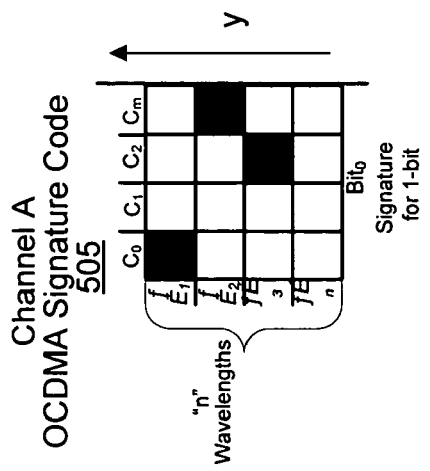
FIG. 3 is a diagram of an exemplary OCDMA signature code.

The optical format of optical data stream 500 used with systems 100 and 200 are now described herein. Specifically, FIGS. 3, 4, and 5 are diagrams of exemplary OCDMA signature codes 505, 506, and 507, whereas FIG. 6 is a diagram of optical data stream 500 using the OCDMA signature codes 505, 506, and 507. In this regard, OCDMA signature codes 505, 506, and 507 illustrate how OCDMA data stream 500 may be encoded and/or decoded.

Each OCDMA signature code is a 2-dimensional construct that uniquely identifies a data channel in an OCDMA network (e.g., OCDMA network 120). For example, OCDMA signature code 505 for a logical "1-bit" for Channel A is represented by spread pattern imposed on chips $C_0 \ldots C_m$ (wherein m is an integer greater than 1) and wavelengths $\lambda_{1...n}$ (i.e., optical data streams $fE_{1...n}$ associated at those wavelengths). OCDMA signature code 506 for a logical "1-bit" of Channel B differs from OCDMA signature code 505 of Channel A with respect to chip and wavelength spread. Similarly, Channel C's OCDMA signature code 507 differs from OCDMA signature codes 506 and 505 with respect to chip and wavelength spread. This "distance" in coding (i.e., differences in chip occupations) allows for channel privatization such that only an OCDMA decoder 403 with knowledge of its proper OCDMA signature code can decode data from OCDMA data stream 500. For example, decoder $403_1$ may be designated as Channel A and therefore may have knowledge of OCDMA signature code 505. As such, decoder $403_1$ may use OCDMA signature code 505 to extract data from OCDMA data stream 500. Similarly, encoder $303_1$ may use OCDMA signature code 505 to encode data for coupling into OCDMA data stream 500 via optical coupler 305.

FIG. 6 depicts OCDMA data stream 500 with channels A, B, and C in a multiplexed fashion. For example, $bit_0$ depicts channels A and C as being active and containing a logical 1-bit, $bit_1$ depicts channels A and B as being active and containing a 1-bit, $bit_2$ depicts channels A, B, and C as being active with logical 1-bits, and $bit_q$ depicts channel A as being active and containing a logical 1-bit. $Bit_q$ is intended to illustrate OCDMA data stream 500 as having a plurality of bits (i.e., q is an integer greater than 1). With channels being defined within OCDMA data stream 500 by OCDMA signatures 505, 506, and 507, various forms of data may be transmitted via channels A, B, and C, respectively. For example, streaming video data from a camera output could be broadcast to several data consumers 402 and/or stored with nonvolatile storage volume unit 106 simultaneously via a designated channel (e.g., channels A, B, and/or C).

OCDMA data stream 500 also illustrates logical 0-bits interspersed with logical 1-bits. For example, when a logical 0-bit from a particular channel (e.g., channels A, B, or C) is transmitted via optical data stream 500, the bit comprises logical 0's (e.g., no light transmission) at all chips for that channel. However, those skilled in the art should readily recognize that the invention is not intended to be limited to logical 0-bits that include no light transmission for all chip/wavelength combinations for a particular bit. Rather, other embodiments may configure logical 0-bits with a particular code, such as described with respect to the logical 1-bits.

Additionally, those skilled in the art should readily recognize that OCDMA data stream 500 may in fact be a continuous data stream populated by more or less channels than those shown herein. For example, the maximum number n of wavelengths $\lambda$ (y-axis) and the number of chips C0 . . . m per bit for a given implementation typically depends on the OCDMA coding scheme employed. As such, the chip/wavelength spread of a particular OCDMA coding scheme may dictate the number of wavelengths and chips per bit for a given OCDMA storage system and/or a given OCDMA retrieval system (e.g., system 100 and system 200, respectively).

FIG. 7 is exemplary data transmission diagram 800 illustrating switched storage for wavelengths of optical data. For example, each tunable filter 103 may be communicatively coupled to a storage volume 107 through a light detector 102. Each tunable filter 103 may variably tune wavelengths of light that compose OCDMA data stream 500 that can be illustrated over time as chips per wavelength of light $\lambda$. Data diagram 800 exemplarily illustrates four optical wavelengths of light designated as $\lambda_1$, $\lambda_2$, $\lambda_3$ and $\lambda_4$, each corresponding to an optical data stream of OCDMA data stream 500. In this embodiment, 6 tunable filters $103_{1\ldots6}$ are used to selectively filter each of the optical wavelengths $\lambda_1$, $\lambda_2$, $\lambda_3$ and $\lambda_4$ as controlled by controller 201. The numbers associated with each optical wavelength designator (i.e., $\lambda_1$, $\lambda_2$, $\lambda_3$ and $\lambda_4$) correspond to a transferred chip of information for that optical wavelength at a given time increment. The question marks (i.e., "???") indicate indeterminate chips where switching by a tunable filter 103 may have occurred.

To illustrate optical wavelength switching, at time increment 0, tunable filters $103_{1\ldots4}$ are respectively filtering optical wavelengths $\lambda_1$, $\lambda_2$, $\lambda_3$ and $\lambda_4$ for storage in storage volumes $104_{1\ldots4}$. At time increment 6, tunable filter $103_1$ may switch to optical wavelength $\lambda_4$. At time increment 10, tunable filter $103_4$ may switch to optical wavelength $\lambda_1$. Between the optical wavelength transitions of tunable filter $103_1$ and $103_4$ (i.e., between time increments 6 and 10), optical wavelength $\lambda_1$ may be "picked up" by an auxiliary tunable filter $103_5$ which filters optical wavelength $\lambda_1$ for storage with storage volume $104_5$ during time increments 2 through 13. Such switching may be continued for the remaining optical wavelengths at time increments as determined by controller 201.

Those skilled in the art should readily recognize that the invention is not intended to be limited to the embodiment shown herein. For example, while four optical wavelengths $\lambda_{1\ldots4}$ are exemplarily illustrated in FIG. 7 as being filtered by 6 optical filters $103_{1\ldots5}$, those skilled in the art should readily recognize that fewer or more optical data streams may be tunably filtered, opto-electronically detected and stored. Additionally, those skilled in the art should readily recognize that the invention should not be limited to the algorithmic manner in which optical data streams are selectively filtered and/or the algorithmic manner in which electronic data systems resulting therefrom are switched to storage volumes $107_{1\ldots n}$. Also, the invention is not intended to be limited to simply storing data with data transmission diagram 800 of FIG. 7. Rather, this information may also be used during data retrieval as described above.

While the above embodiments have been shown and described in sufficient detail so as to enable one skilled in the art to make and use the invention, the invention is not intended to be limited to these embodiments. Those skilled in the art should readily recognize that certain features may be implemented in different ways. For example, certain steps may be implemented optically and/or electronically (e.g., such as with optoelectronic components). Additionally, such features may be controlled via firmware and/or software. Those skilled in the art are readily familiar with optoelectronics, software and firmware.

The foregoing description of the present invention has been presented for purposes of illustration and description. Furthermore, the description is not intended to limit the invention to form disclosed herein. Consequently, variations and modifications commensurate with the above teachings, and skill and knowledge of the relevant art, are within the scope of the present invention. The embodiments described hereinabove are further intended to explain best modes known as practicing the invention and to enable others skilled in the art to utilize the invention in such or other embodiments with various modifications required by the particular application(s) or use(s) of the present invention. It is intended that the appended claims, therefore, be construed to include alternative embodiments to the extent permitted by the prior art.

What is claimed is:

1. An Optical Code Division Multiple Access ("OCDMA") storage system, comprising:
   an optical splitter optically interconnected with an optical network;
   a plurality of tunable filters optically interconnected with said optical splitter;
   a plurality of light detectors respectively optically coupled to said plurality of tunable filters, wherein each light detector of said plurality of light detectors is operable to convert a filtered optical signal filtered by a corresponding one of said plurality of tunable filters into a corresponding electronic data stream, wherein each said filtered optical signal comprises a single tuned wavelength of light;
   a plurality of nonvolatile storage volumes communicatively coupled to said plurality of light detectors, wherein each nonvolatile storage volume stores one of said corresponding electronic data streams such that said filtered optical signal associated with said corresponding data stream is reproducible; and
   a controller that controls the wavelength of light to be tuned by each tunable filter of said plurality of tunable filters, wherein said controller switches a first tunable filter of said plurality of tunable filters from a first wavelength of light that is also filtered by a second tunable filter of said plurality of tunable filters to a second wavelength of light that is also filtered by a third tunable filter of said plurality of tunable filters,
   wherein said optical splitter receives an OCDMA data stream from said optical network, wherein said plurality of nonvolatile storage volumes together store said OCDMA data stream such that said OCDMA data stream is reproducible.

2. The OCDMA storage system of claim 1, wherein said optical splitter divides said OCDMA data stream into a plurality of divided power OCDMA data streams.

3. The OCDMA storage system of claim 2, wherein each tunable filter receives one divided power OCDMA data stream from said optical splitter and selects one wavelength of light of said one divided power OCDMA data stream to filter at a time.

4. The OCDMA storage system of claim 1, wherein said OCDMA data stream consists of a plurality of transmission frequencies, wherein said plurality of tunable filters comprises more tunable filters than the number of said plurality of transmission frequencies, wherein said optical splitter splits said OCDMA data stream to be stored by said OCDMA storage system into a plurality of optical signals, wherein the number of said plurality of optical signals is at least equal to the number of tunable filters of the OCDMA storage system.

5. The OCDMA storage system of claim 1, wherein said plurality of tunable filters comprises at least four tunable filters.

6. The OCDMA storage system of claim 1, wherein said plurality of nonvolatile storage volumes comprise at least one of a rotating disk drive and a flash memory card.

7. The OCDMA storage system of claim 4, wherein said OCDMA storage system records timing information for each corresponding electronic data stream, wherein said OCDMA storage system records a pattern associated with switching the wavelength of light to be tuned by each tunable filter of said plurality of tunable filters, wherein together said timing information and said pattern are recorded such that said OCDMA data stream is reproducible from said corresponding electronic data streams stored on each nonvolatile storage volume.

8. The OCDMA storage system of claim 1, wherein said OCDMA data stream consists of a plurality of transmission frequencies, wherein said plurality of tunable filters comprises more tunable filters than the number of said plurality of transmission frequencies, wherein said optical splitter splits said OCDMA data stream to be stored by said OCDMA storage system into a plurality of optical signals, wherein the number of said plurality of optical signals is more than the number of said plurality of transmission frequencies, wherein said OCDMA storage system records timing information for each corresponding electronic data stream, wherein said OCDMA storage system records a pattern associated with switching the wavelength of light to be tuned by each tunable filter of said plurality of tunable filters, wherein said OCDMA storage system reproduces said OCDMA data stream at a later date.

9. The OCDMA storage system of claim 1, wherein said OCDMA data stream consists of a plurality of transmission frequencies, wherein said plurality of tunable filters comprises more tunable filters than the number of said plurality of transmission frequencies, wherein said optical splitter splits said OCDMA data stream to be stored by said OCDMA storage system into a plurality of optical signals, wherein the number of said plurality of optical signals is more than the number of said plurality of transmission frequencies, wherein said OCDMA storage system records timing information for each corresponding electronic data stream, wherein said OCDMA storage system records a pattern associated with switching the wavelength of light to be tuned by each tunable filter of said plurality of tunable filters, wherein said OCDMA storage system reproduces said OCDMA data stream using said timing information and said pattern.

10. The OCDMA storage system of claim 1, wherein said OCDMA data stream consists of a plurality of transmission frequencies, wherein said plurality of tunable filters comprises more tunable filters than the number of said plurality of transmission frequencies, wherein said optical splitter splits said OCDMA data stream to be stored by said OCDMA storage system into a plurality of optical signals, wherein the number of said plurality of optical signals is more than the number of said plurality of transmission frequencies, wherein said OCDMA storage system records timing information for each corresponding electronic data stream, wherein said OCDMA storage system reproduces said OCDMA data stream using said timing information.

* * * * *